I. F. TAYLOR.
AERIAL APPARATUS FOR DEFENSE AGAINST HOSTILE AIRCRAFT AND FOR OTHER PURPOSES.
APPLICATION FILED MAR. 9, 1917.

1,230,881.

Patented June 26, 1917.
6 SHEETS—SHEET 1.

I. F. TAYLOR.
AERIAL APPARATUS FOR DEFENSE AGAINST HOSTILE AIRCRAFT AND FOR OTHER PURPOSES.
APPLICATION FILED MAR. 9, 1917.

1,230,881.

Patented June 26, 1917.

Inventor:-
Isaac Francis Taylor,
By:- B. Singu,
Atty.

I. F. TAYLOR.
AERIAL APPARATUS FOR DEFENSE AGAINST HOSTILE AIRCRAFT AND FOR OTHER PURPOSES.
APPLICATION FILED MAR. 9, 1917.

1,230,881.

Patented June 26, 1917.
6 SHEETS—SHEET 4.

I. F. TAYLOR.
AERIAL APPARATUS FOR DEFENSE AGAINST HOSTILE AIRCRAFT AND FOR OTHER PURPOSES.
APPLICATION FILED MAR. 9, 1917.

1,230,881.

Patented June 26, 1917.
6 SHEETS—SHEET 5.

Inventor:-
Isaac Francis Taylor
By:- B. Singer,
Atty.

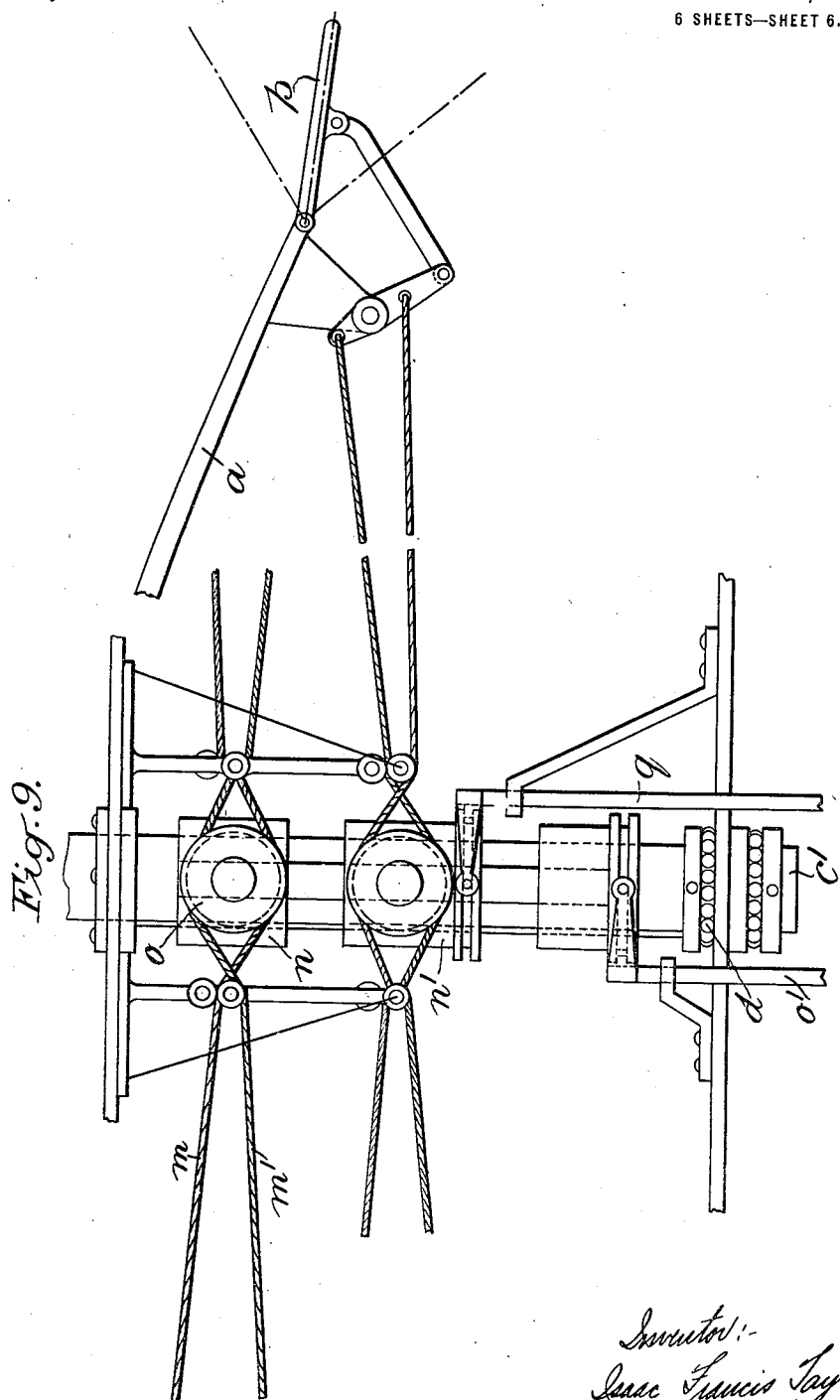

UNITED STATES PATENT OFFICE.

ISAAC FRANCIS TAYLOR, OF EAST DULWICH, LONDON, ENGLAND, ASSIGNOR OF ONE-HALF TO SAMUEL PICK, OF LONDON, ENGLAND.

AERIAL APPARATUS FOR DEFENSE AGAINST HOSTILE AIRCRAFT AND FOR OTHER PURPOSES.

1,230,881.      Specification of Letters Patent.      Patented June 26, 1917.

Application filed March 9, 1917. Serial No. 153,694.

*To all whom it may concern:*

Be it known that ISAAC FRANCIS TAYLOR, a subject of the King of Great Britain and Ireland, residing at 5 Upland road, East Dulwich, London, England, has invented certain new and useful Improvements in Aerial Apparatus for Defense Against Hostile Aircraft and for other Purposes, of which the following is a specification.

This invention for improvements in aerial apparatus for defense against hostile aircraft and for other purposes has for its object: Firstly to provide an effective means of defense against hostile invasion by airships or other aircraft: secondly to provide means whereby the capture or destruction of hostile aircraft shall be rendered more certain and easy of accomplishment than heretofore: thirdly to provide means whereby aerial navigation across any particular zone or over any particular area can be made difficult or dangerous to such a degree as to be practically impossible, and finally to enable effective defensive measures to be employed and carried out at all navigable altitudes by day or night and controlled from appliances located on land, or on water or in the air.

One of the main features of the invention is an improved vertical lift heavier-than-air machine and the invention may be said to mainly reside in or center around this feature which enables many operations which could only be effective heretofore with great difficulty if at all, now to be successfully carried out.

In this connection it may be pointed out that although several attempts have been made to construct a practical aerial machine on the so-called helicopter principle all such attempts have so far as the applicants are aware, resulted in failure owing to inherent defects in the design of the machines such as instability, wrong methods of applying the power or for numerous other reasons, in fact, the difficulties to be overcome have hitherto proved insurmountable.

In addition to the said vertical-lift machine which is capable of rapidly ascending in the air to the required height but susceptible of easy control as to altitude and position, manned or not according to requirements and carrying when necessary defensive, offensive or other appliances, the present invention also includes apparatus for controlling such machine and the appliances carried thereon either from the machine itself or from a distance and means connecting the aerial machine with the controlling apparatus when such control is effected at a distance and also including or forming in part electrical or other controlling devices.

The invention is hereinafter described with reference to the accompanying drawings in which:

Fig. 9 is a side elevation showing a suitable operative connection between the engines and ailerons and their controlling levers.

In the drawings similar letters of reference are employed to designate similar parts throughout the different views.

As shown the aerial machine comprises two main planes $a$ $a$ inclined in opposite directions and fixed to diametrically opposed lugs $b$ $b$ on a sleeve $c$ mounted to revolve between ball thrust bearings $d$ on a preferably hollow central vertical shaft $c'$.

The main plane near the leading edge of each plane is braced to the framing of the adjacent trailing edge by suitably inclined brace members $e$ while the outer ends of the planes $a$ $a$ are connected with a collar $f$ on the top of the sleeve $c$ by wire stays $g$.

Motors $h$ are mounted in suitable frames supported partly from the main planes by stays $h'$ and partly from the central sleeve by wire stays $i$ and a suitable girder $j$ connected by stays $j'$ with the main planes, The motors $h$ drive tractor screws or propellers $k$, and are fed with fuel from a tank $l$ mounted on the central sleeve and revolving with the main planes, the feed being effected or assisted by centrifugal action as will be readily understood.

Figure 1:
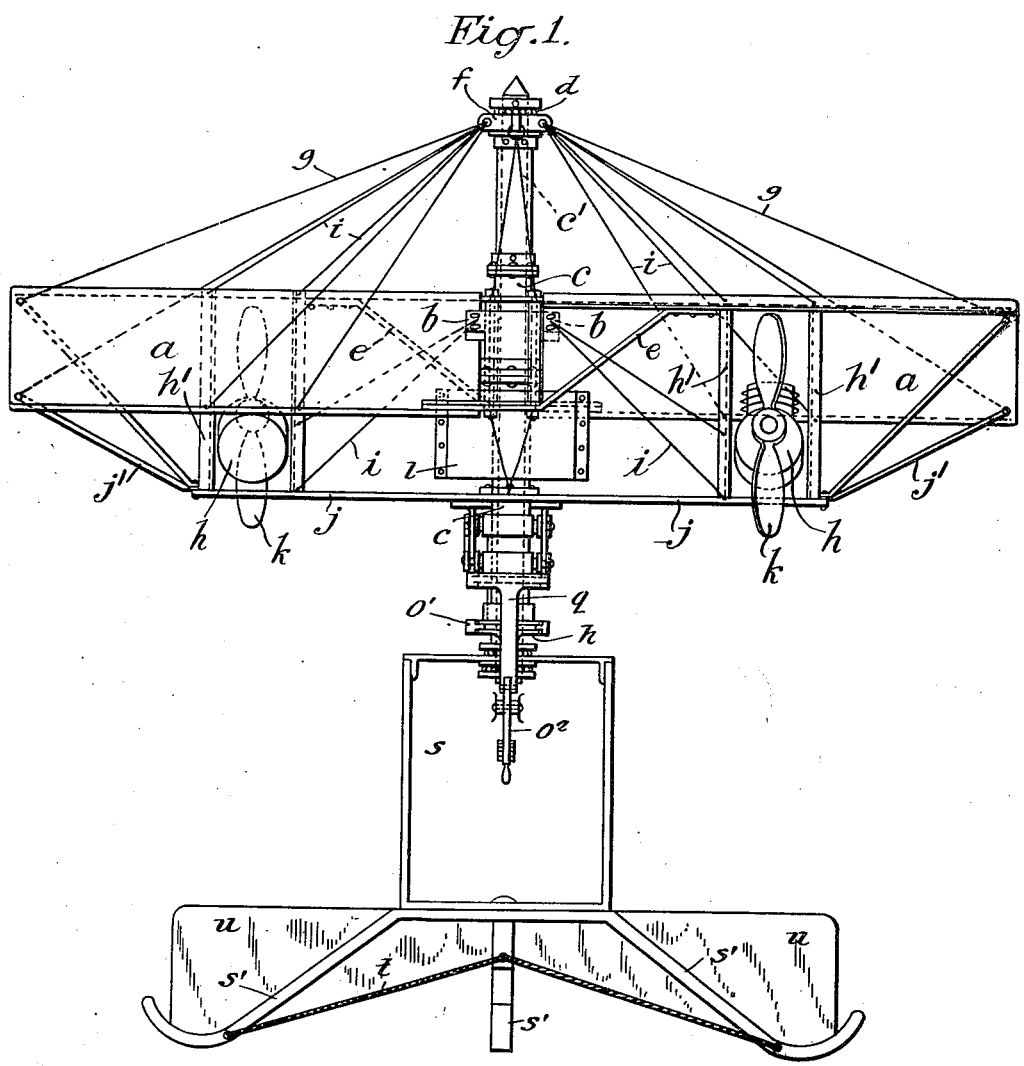
Figure 1 is a front elevation of a vertical-lift aerial machine constructed according to this invention.
Figure 2:
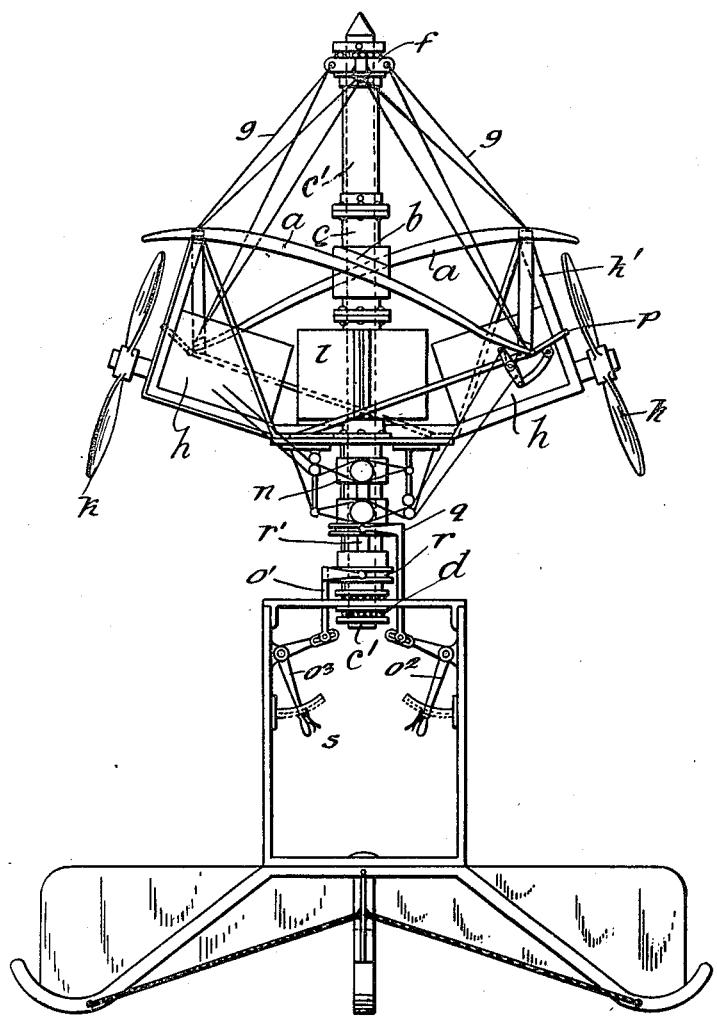
Fig. 2 is a side elevation of the same.
Figure 3:
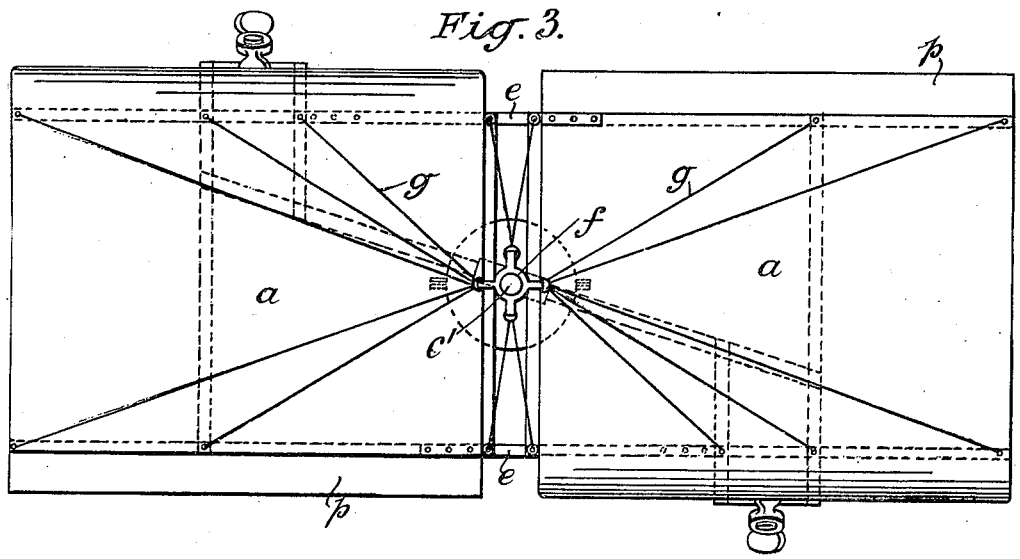
Fig. 3 is a plan.
Figure 4:
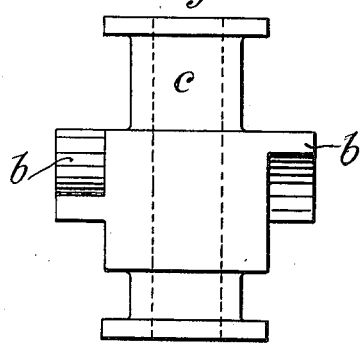
Figs. 4 and 5 are detail views.
Figure 5:
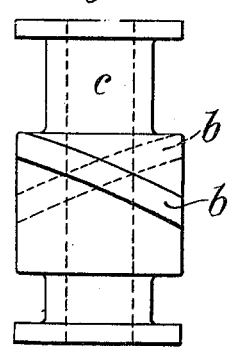

Any suitable means of control for the motors may be adopted one suitable arrangement being clearly shown in Figs. 2 and 9 and comprising cords or the like $m$ $m'$ tightened or slackened alternately by imparting a vertical movement upward or downward to a collar $n$ carrying a pulley $o$. As shown in Fig. 2 the collar $n$ is actuated by a hand lever $o^3$ through a forked rod $o'$ arranged to engage an annular groove in the collar $r$ which is connected by rods $r'$ with the collar $n$ and has a key or feather connection with the sleeve $c$ so that it rotates with said sleeve. Similarly a second vertically sliding collar $n'$ is operatively connected with cords leading to the levers of the ailerons $p$ and actuated from a hand lever $o^2$, through a fork $q$ engaging the grooved collar $n'$, these ailerons control the ascent or descent and also enable the machine to hover.

Figure 6:
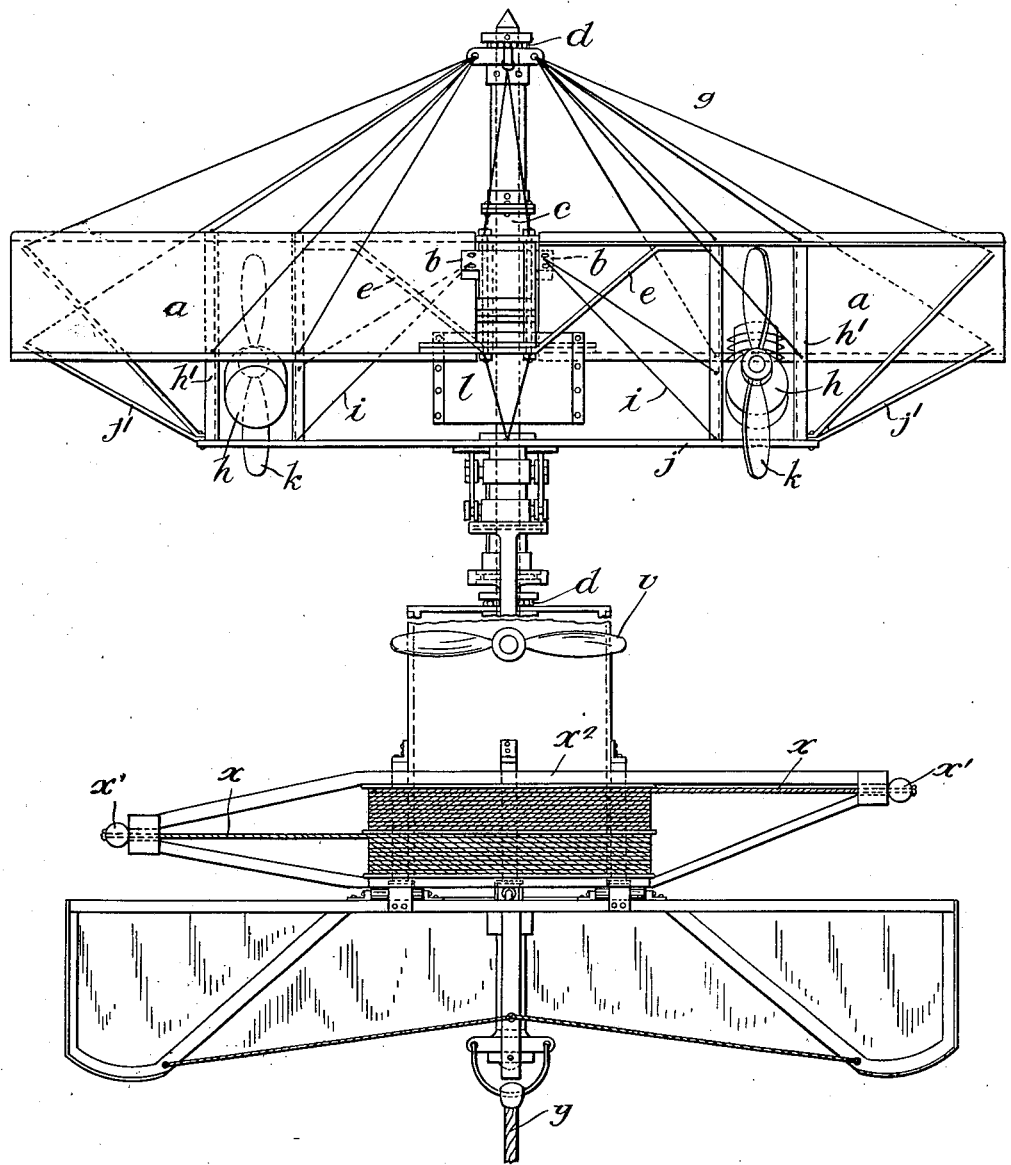
Fig. 6 is a similar view to Fig. 1 showing the machine fitted with a centrifugal defensive appliance.
Figure 7:
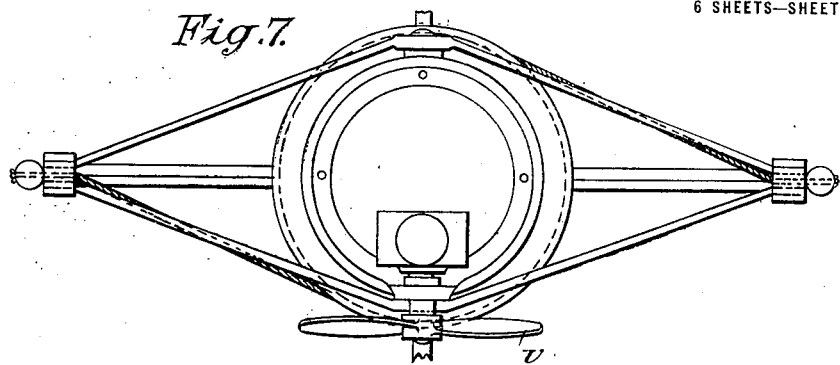
Fig. 7 is a plan of said centrifugal appliance.
Figure 8:
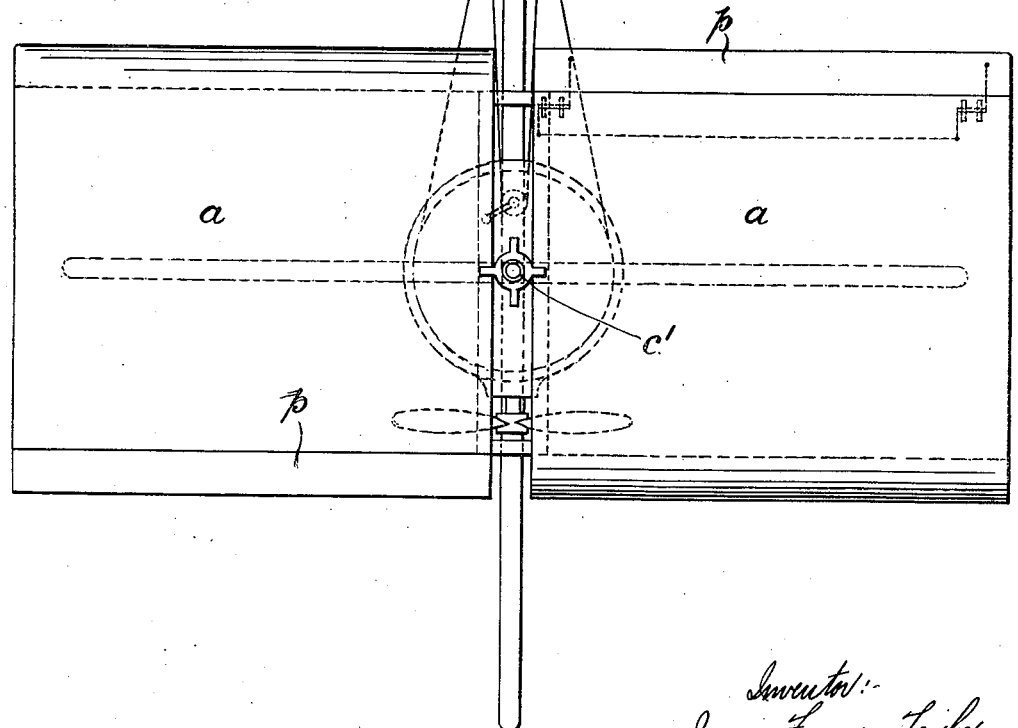
Fig. 8 is a diagrammatic plan of a machine showing a rudder and ailerons fitted thereto.

For the accommodation of a pilot a car $s$ is freely suspended on the central shaft and fitted with four legs or skids $s'$, which may also have wheels or floats in some cases, and are connected by wire stays $t$ to a central bolt. Two or more of these legs may be formed with canvas fins $u$ to resist undesired rotary movement of the car $s$. For the same purpose a small motor could be employed to drive a tractor screw or propeller for controlling rotation of the car $s$. The machine could also be equipped with a tractor screw $v$ as shown in Fig. 6 for going ahead or astern and with a rudder $w$ for steering. By this means also an orbital ascending motion could be imparted to the machine when desired.

For the defense of coast lines or the like the aerial machines may be employed in various ways. They may be held captive and controlled entirely or in part from earth, or manned and arranged to carry their own controls.

According to one method each aerial machine is held captive by a cable $y$ Fig. 6 which is led over a drum or winch not shown situated at a controlling base and capable of running out or winding up the cable as required, said cable carrying or being in part formed of electric insulated conductors for conveying current from a dynamo or other source at the controlling base to electromagnetic appliances on the aerial machine for actuating clutches or the like. The various contacts between rotating and stationary parts on the aerial machines are made in a known manner by means of contact brushes and rings. The aerial bases are located at suitable distances apart and their aerial machines are arranged to carry up a light wire rope or netting which would extend continuously along the whole series of machines and from an aerial barrier along the portion of coast line to be protected, such wire carrying hooks or other grapple devices.

According to another method each aerial machine carries independent defensive appliances such as light ropes $x$ Fig. 6 loaded with explosive or other weights $x'$ at the ends or with grapple devices and unwound by centrifugal action from drums $x^2$ mounted to revolve on the car of the aerial machine. Arms $z$ over which the ropes are led are arranged to be driven by a motor in the car suitably geared thereto, when it is desired to run out the wires, said wires as they run out sweeping ever widening circles until the limit of their length is reached. To draw in the wires the drums are clutched or held stationary, by inserting a bolt or pin while the arms are allowed to continue rotating this winding up the wires.

From the foregoing description it will be seen that several machines may be arranged to coöperate for forming a defensive barrier extending over a considerable distance, but it will be also understood that one or more machines may be used for observation purposes or for the protection of military bases, encampments, buildings, ships or the like, and may be suitably controlled either by being manned or from a bombproof shelter or armored motor vehicle. The machines may also in some cases be fitted with guns.

What I claim and desire to secure by Letters Patent is:—

1. An aerial machine of the helicopter type comprising oppositely inclined main lifting planes or wings extending in opposite directions, a central shaft about which said wings are mounted to revolve, aerial screws mounted on said planes or wings, motors for driving said screws also mounted on said wings, a car suspended from said central shaft, and means for controlling said motors from said car.

2. An aerial machine of the helicopter type comprising oppositely inclined main lifting planes or wings extending in opposite directions, a central shaft about which said wings are mounted to revolve, aerial screws mounted on said planes or wings, motors for driving said screws also mounted on said wings, a long sleeve mounted to rotate on the central shaft to which said wings are fixed and from which they extend, a car attached to the lower end of said shaft, a collar for controlling said motors slidably mounted on said long sleeve, and means within said car for operating said collar.

3. An aerial machine comprising two main lifting planes or wings inclined in opposite directions and mounted to revolve about a central axis, driving means acting upon the air mounted on the lifting planes or wings, drums carried on the machine, and explosive or other appliances carried on ropes unwound from said drums by centrifugal action.

In testimony whereof I have affixed my signature, in presence of two witnesses.

ISAAC FRANCIS TAYLOR.

Witnesses:
SAMUEL PERCIVAL,
GEORGE HEDGER.